United States Patent [19]

Van Heel

[11] 3,725,874

[45] Apr. 3, 1973

[54] SEGMENT ADDRESSING

[75] Inventor: Jean J. Marie D. Van Heel, Beekbergen, Netherlands

[73] Assignee: U.S. Philips Corporation, New York, N.Y.

[22] Filed: Sept. 2, 1971

[21] Appl. No.: 177,442

Related U.S. Application Data

[63] Continuation of Ser. No. 822,681, May 7, 1969, abandoned.

[30] Foreign Application Priority Data

May 11, 1968 Netherlands ........................6806735

[52] U.S. Cl. ..............................................340/172.5

[51] Int. Cl. ..............................................G06f 3/00

[58] Field of Search ...................................340/172.5

[56] References Cited

UNITED STATES PATENTS

| | | | |
|---|---|---|---|
| 3,210,733 | 10/1965 | Terzian | 340/172.5 |
| 3,239,816 | 3/1966 | Breslin | 340/172.5 |
| 3,319,226 | 5/1967 | Mott et al. | 340/172.5 |
| 3,340,513 | 9/1967 | Kinzie et al. | 340/172.5 |
| 3,412,382 | 11/1968 | Couleur | 340/172.5 |
| 3,461,433 | 8/1969 | Emerson | 340/172.5 |
| 3,510,847 | 5/1970 | Carlson | 340/172.5 |
| 3,533,075 | 10/1970 | Johnson | 340/172.5 |

*Primary Examiner*—Harvey E. Springborn
*Attorney*—Frank R. Trifari

[57] ABSTRACT

A computer comprising a store addressable in segments, containing segment words selectable by segment numbers, which words contain data of the segment, for example, a segment base address and a segment length information, in which two or three segment word registers are provided for storing two or particularly three segment words in order to ensure a rapid run of the programmes in the event of frequent change of addressing in a plurality of segments. The computer for this purpose with a detection device for detecting whether and, if so, in which of the in total two or three segment word registers the segment word of an indicated segment in a segment number register is stored. In the presence of the relevant segment word it is released via gates for calculating the address and for length check. In the absence of said segment word this word is carried on from the store to a segment word register. Particularly one of the three segment word registers is constantly reserved for storing the segment word of one given segment (O-segment).

4 Claims, 3 Drawing Figures

Figure 1:
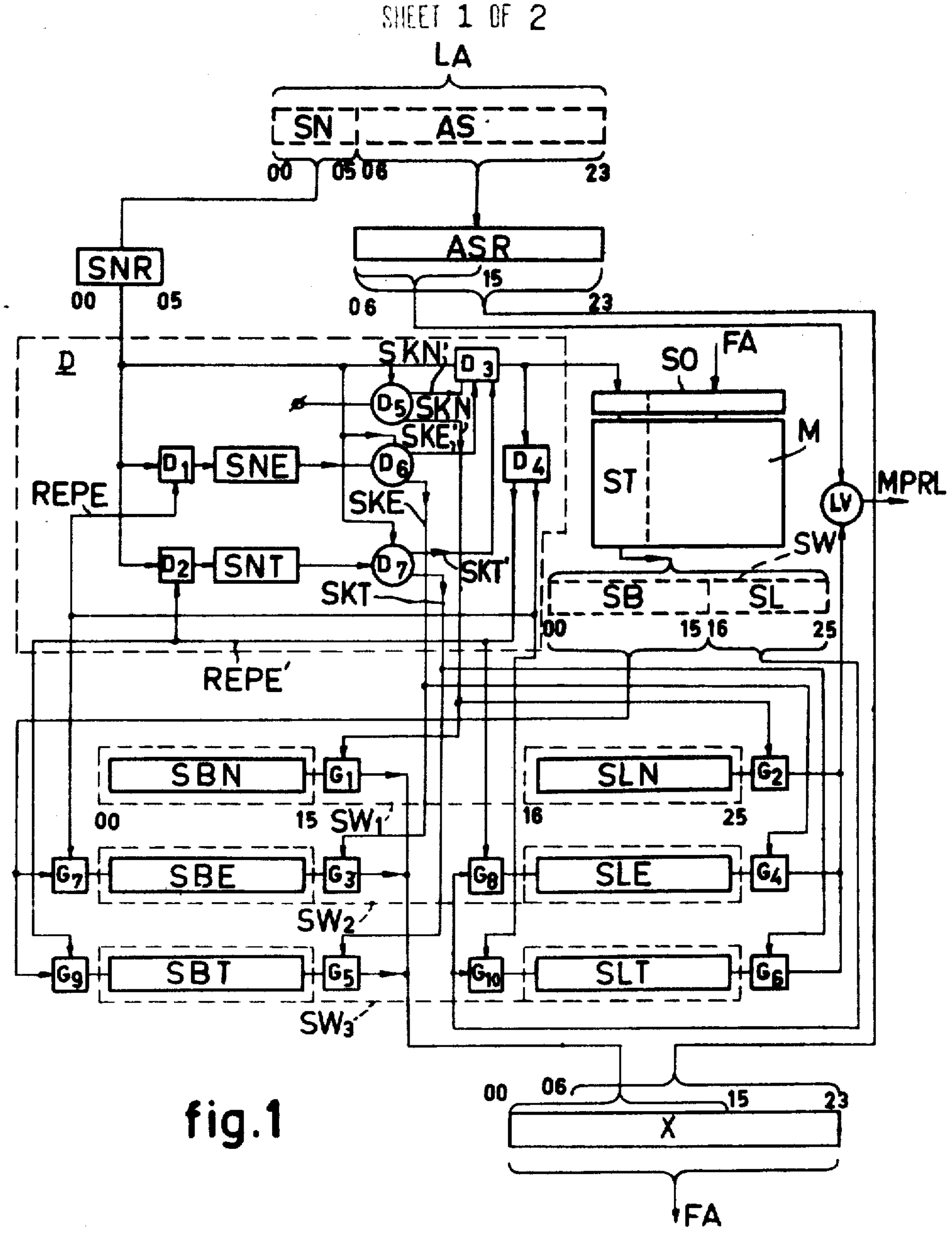

INVENTOR.
JEAN J.M. DUDOK VAN HEEL
BY
Frank R. Trifari
AGENT

PATENTED APR 3 1973

3,725,874

SHEET 2 OF 2

INVENTOR.

JEAN J.M DUDOK VAN HEEL

BY

AGENT

SEGMENT ADDRESSING

This is a continuation, application Ser. No 822,681, now abandoned, filed May 7, 1969.

The invention relates to a computer comprising a store which is addressable in a plurality of numbered segments having for this purpose a number of memory locations selectable by segment numbers from a segment number register, where segment words containing at least segment base addresses and segment length data are stored, said computer comprising furthermore means suitable for converting, in accordance with the segments addressing, logical addresses i.e., addresses referenced to a beginning of a segment into physical memory addresses for selection in the memory itself, said means comprising a first segment word register composed of a part storing the base address and a part storing the segment length datum of one segment and furthermore a register for storing a logical address to be converted, a summation device in which address parts of the segment word register and the logical address register are compiled to a physical address and a comparison device for comparing a segment length datum with a corresponding logical address part for checking whether a given logical address is located in the given segment. Such computers having a so-called segment indexing are known. A computer programme may be divided into a number of segments and the addressing of the programme is made with reference to the beginning of the segment in the segments, which have an individual number and a given length (— a number of addresses inside a segment). In this Patent Application the term segmenting is also understood to mean the method in which logical addressing is practised in the programmes as a whole and the programmes may be considered as forming individual segments. The use of logical addressing is highly important for obtaining a most simple programming of a computer. In a segmented programme only the so-called logical addresses need be stored or ignored. The detection of a so-called physical memory address associated with a logical address is performed in the computer itself. Therefore, the programmer need not continuously have a survey of all physical memory addresses and may confine himself for each segment to the logical addresses contained therein. In order to indicate to which segment said logical addresses in a segment are referencing, a part of the logical addresses forms the number of the segment concerned. The segment numbers are referenced in the store to corresponding storage locations. At such memory a word (segment word) is found which contains at least the segment length data and an address indicating which physical address of the store is the base of the segment (so-called segment base address). The group of these segment words is termed the segment table.

When a programme is run and when a logical address is applied then the segment word is selected, on the basis of the segment number which is part of the said logical address and this segment word is stored in a first segment word register. The logical address itself is also stored in a register and by subjecting parts of the contents of the two registers to summation the physical memory address is compiled.

The above-mentioned indexing method has the disadvantage that, when it is required to change over in a programme from one segment to a further segment and particularly when in a given segment, subsequent to addressing in any further segment renewed indexing has to be performed, the repetitive selection and reading of the segment words from the store have a delaying effect on the running of a programme.

Object of the invention is to mitigate said disadvantage without leaving the factor of costs out of consideration. The invention is characterized in that apart from said first segment word register for storing a segment base address and the segment length datum of one segment at least one further or particularly, two further segment word registers are provided for storing the segment base address and the segment length datum of one or two further segments, whilst the segment number register is followed by a detection device for detecting whether and, if so, in which of the in total at least two or particularly three segment word registers the segment word of an indicated segment in the segment number register is stored, said device applying a control-signal to the relevant one of said two or three segment word registers, whereas in the absence of a segment word of a desired segment in one of said two or three segment word registers the detection device applies a control signal for carrying on said segment word from the store to one of the segment word registers.

This means that at the same time at least two or particularly three segment words can be stored in two or three segment word registers provided for this purpose. In this way the segment word for addressing in only a small number of the segments for economic reasons are directly available; because frequent segment change between many (for example more than three) segments does not often come up in practice, said number may unobjectionably be chosen to be small (at least two, particularly three). The choice of the number of at least two or particularly three is of additional importance for the following reason. In segmented programmes there is always one segment (the O-segment) in which between addressing in other segments frequent addressing is required so that great advantages are involved in having the segment word concerned constantly available in a O-segment word register. In such case, only one more segment word register in addition for storing any further segment word is often sufficient to obviate the above-mentioned disadvantage. Two registers apart from the O-segment word register for storing two segment words differing from the O-segment word are in general undoubtedly sufficient, since as stated above a frequent segment change between more than two segments and/or the O-segment does not often occur or is only rare in programmes. A further very important reason for using two segment word registers, if there is no separate O-segment word register, and in total three segment word registers, if a separate O-segment word register is available, is that in carrying out so-called field instructions (moves) there is need for instructions from different aletenating segments. When the segment words of two segments are each stored in a segment word register, the move can be carried out rapidly in spite of the alteration. In the case of field instructions a segment word is replaced in a segment word register preferably in a segment word register which has not been filled as the last one. In practice a segment word contains apart from the segment base address and the segment length datum at least one segment accessibility datum. In the computer according to the invention only one of the two or only two of the three segment word registers need have space for storing this segment accessibility information, because the O-segment of a programme always has the same accessibility datum so that this need not be given again in the O-segment word register.

It should be emphasized that the segmenting described here refers not only to segmented programmes but also to programmes logically addressed as a whole and forming so to say individual segments. A segment word is then a programme word, a segment word register a programme word register, a segment base a programme base, a segment length a programme length, a segment number a programme number.

If a computer allows both for segment addressing and programme addressing, the same means may be employed for this purpose. Since the programme lengths (for example, 16 bits) may considerably exceed segment length (for example, 10 bits), it is necessary for the segment word and length register portions to match the maximum length. For changing over from one type of addressing to the other a control-device is provided which provides a signal at a changeover for exciting the segment word register to store the O-segment word of one type of the other type of segment addressing. It may furthermore be imagined that only with the first-mentioned segment indexing two or three segment word registers according to the invention are required, whereas with programme addressing in the same computer there is no need for using these two or three registers but only for one register as a programme word register because the alteration between programmes is considerably less frequent than alternation between segments. Consequently only one segment word register has to be sufficiently large for storing the maximum programme length information. For this purpose, the O-segment word register is preferred because then no accessibility information is concerned here, like in programme addressing.

Figure 2:
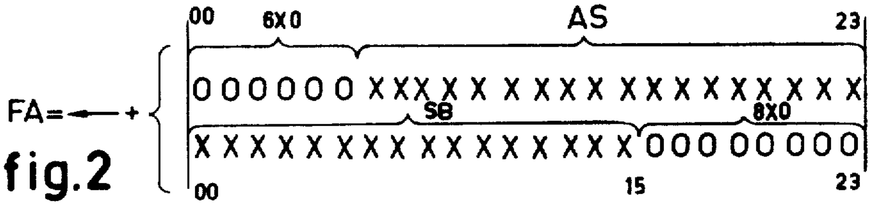
Figure 3:
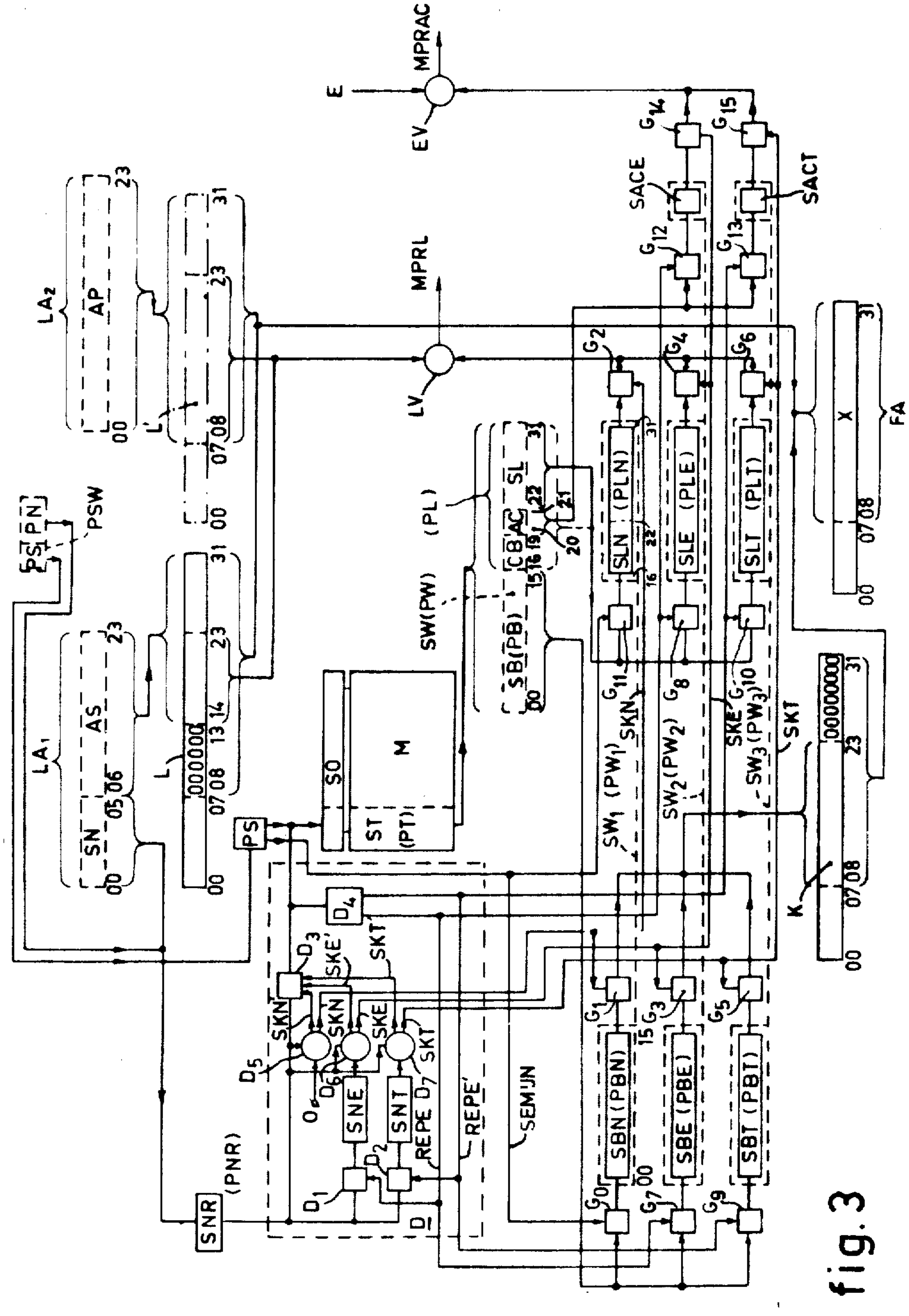

The invention will be described more fully with reference to the drawing, in which FIG. 1 shows schematically one embodiment of a computer according to the invention, FIG. 2 shows schematically the address array and FIG. 3 shows a further detailed embodiment of a computer in accordance with the invention.

Corresponding parts of the Figures are designated by the same references. It is supposed that three segment word registers are available. M is the store in which addressing has to take place; a portion ST, the so-called segment table thereof, serves for storing the segment words SW (symbolically outlined in broken lines). SO is the store selection member to which the physical addresses FA of the words to be selected are applied. An applied logical address LA (outlined by broken lines) of a word to be selected has to be converted into the physical address FA. In this example the logical address LA has 24 bits (00 to 23) and consists of a segment number SN of 6 bits (00 to 05) and an address in the segment AS, consequently of 18 bits (06 to 25). The segment number SN is stored in the segment number register SNR and the address in the segment AS is stored in the logical address register ASR. D is a detection device following the segment number register SNR and comprises the registers SNE and SNT, the gates $D_1$, $D_2$ and $D_3$, a s election device $D_4$ and a comparison device $D_5$, $D_6$, $D_7$. The three segment word registers are indicated by dotted lines $SW_1$, $SW_2$ and $SW_3$ and comprise portions SBN, SBE and SBT for storing segment base addresses SB of segment words SW and portions SLN, SLE and SLT for storing segment length data SL of segment words SW. $G_1, G_2, \ldots G_{10}$ are and-gates. LV is a segment length checking device having an output MPRL. Finally X designates a summation device in which address portions of a segment word register $SW_1$ or $SW_2$ or $SW_3$ and of the logical address register ASR are compiled to form a physical address FA. Although the Figures illustrate a partial series-parallel processing of the information, it should be noted that a completely series and particularly a completely parallel information processing is allowed without the need for further means.

The arrangement described above operates as follows:

A logical address LA is applied from a computer portion (not shown) for conversion into a physical address FA. The segment number SN is inserted into the segment number register SNR. In the detection device D the segment number SN is compared with the segment number O (SNN) (O-segment) in the comparison part $D_5$. This does not require a separate SNN register, since SN -O can be directly detected. If the segment number SN-O, the comparison device $D_5$ provides a signal on the conductor SKN. At the same time the segment number SN is compared with the segment numbers in the registers SNE and SNT of the detection device D. This Consequently, carried out in the comparison part $D_6$, $D_7$. If the segment number SN- SNE, a signal appears on the conductor SKE and if the segment number SN- SNT, a signal appears on the conductor SKT. Consequently, one of the conductors SKN, SKE, SKT can be energized. If a comparison in the comparison device $D_5$, $D_6$, $D_7$ does not result in equality to the segment number SN, a signal appears on the respective conductors SKN', SKE' and SKT'. When none of the conductors SKN, SKE and SKT is energized, all conductors SKN', SKE' and SKT' are energized and thus open the and-gate $D_3$, which passes on said segment number SN to the selection member SO of the store. With this segment number SN the corresponding segment word SW is found in the memory M. SW (having here 26 bits, see FIG. 1 at the output of M, 00–25) appears at the output of M. This segment number produces a signal on a conductor REPE or on a conductor REPE' also in a selection device $D_4$, when the gate $D_3$ is open. The selection device $D_4$ determines in which of the two segment word registers $SW_2$ or $SW_3$ (segment word register $SW_1$ always has the data of the O-segment i.e., SBN as the O-segment base address and SLN as the O-segment length information) the newly selected segment word SW has to be written and any previous segment word has to be replaced. The replacement of previous segment words in the registers $SW_2$ and $SW_3$ can be performed by the selection device in a fixed order of succession (first in $SW_2$, then in $SW_3$, again in $SW_2$, etc), but it may alternatively be carried out in accordance with a programmed scheme and/or in dependence upon the segment numbers present in the registers SNE and SNT. In the case of field instructions it applies in general to said replacement that the segment word last introduced is not replaced. After the selection the gate $D_1$ or $D_2$ is opened via the conductor REPE or REPE' and the previous segment number in the register SNE or SNT is replaced by the new segment number SN. At the same time the gates $G_7$ and $G_8$ or the gates $G_9$ and $G_{10}$ are opened via the conductors REPE or REPE' respectively so that the segment base SB (here 16 bits: 00 to 15) of the selected segment word SW is stored in the relevant segment word register portion SBE or SBT and the segment length SL (here 10 bits: 16 to 25) of the selected segment word SW is stored in the relevant segment word register portion SLE or SLT.

It will now be supposed that the applied segment number SN is O or corresponds to the contents of one of the registers SNE or SNT. One of the conductors SKN, SKE or SKT is then energized and opens the gates $G_1$ and $G_2$, if SN -O, the gates $G_3$ and $G_4$, if SN - SNE or the gates $G_5$ and $G_6$, if SN - SNT.

The number n is the length datum SL of a segment and in a segment word SW it occupies the bit locations 16 to 15. In the address-in-one segment AS (bits 06 to 23 of a logical address LA) the length datum SL is contained in the first ten bits: bits 06 to 15. The bits 16 to 23 indicate the locations in the group of 256 - 2$^8$ octades. A length check for preventing addressing beyond the limits of a given segment is performed in the length check device LV. Herein the magnitude of the linear number at the bit locations 06 to 15 of the address AS, stored in the register ASR, is compared with the magnitude of SL, hence also 10 bits, in the segment word register portion SLN or SLE or SLT, selected via the gate $G_2$, $G_4$ or $G_6$. If SL> $AS_{06\ 15}$, the address lies within the segment concerned; if SL > $AS_{06}{}^{-}{}_{15}$, the address lies beyond the segment and an alarm signal is produced across the output MPRL (memory protection on length) of the device LV.

The physical address FA is compiled in the summation device from the segment base address SB applied through the opened gate $G_1$, $C_3$ or $C_5$ and stored in the segment word register portion SBN or SBE or SBT and supplemented by 8 noughts and from the address-in-the-segment AS stored in the register ASR and preceded by 6 noughts as is indicated in FIG. 2

FIG. 3 shows a detailed diagram of a computer in accordance with the invention. The segment words SW have a length of 32 bits and are formed by 1. a portion SB (segment base address 16 bits: 00 to 15).
2. a portion CB (a number of possible checking bits: 4 bits: 16 to 19), the portion CB is not explained further here; it only serves to illustrate a practically total form of segments words.
3. a portion AC containing the segment accessibility bits (2 bits: 20 and 21) and
4. a portion SL, the segment length (10 bits: 22 to 31).

In this Figure it is furthermore illustrated how the computer can operate both in segment indexing in the case of segmented programmes and in segment indexing in the sense of programme indexing, in which case the individual programmes may be considered to form segments. (The symbol S is replaced in the Figure by the symbol (P)). A programme word PW contains two portions PB, the programme base, and PL, the programme length. The programmes are referenced by a programme number PN: 4 bits for a number of programmes of 16. A supplied logical address LA, refers to segment indexing and a supplied logical address $LA_2$ refers to programme indexing. $LA_2$ does not contain a number PN, unlike segment indexing, since this number is found in the so-called programme status word PSW. The changeover from segment indexing to programme indexing or conversely (status change) has to be announced. This is done in the so-called programme status word (PSW), which causes the device PS to provide a signal for preparing the arrangement for the other indexing mode.

The logical addresses are stored in a computer register L, which has a length of a normal computer word, here for example 32 bits. The last 24 bit locations serve for storing the logical addresses. In FIG. 3 an address AS i.e., an address-in- the-segment is considered to be in the L-register, whilst an imaginary register L' (dot-and-dash line) contains an address-in-a programme AP. (In practice either one type of address or the other is present in the L-register).

When the computer operates in segment indexing, the segment word register portion SBN is filled, like in FIG. 2, with the base address of the O-segment and the segment word register portion SLN is filled with the segment length of the O-segment. The two other segment word registers $SW_2$ and $SW_3$ are filled with two further segment words. Additions are then the segment word register portion SACE and SACT for storing the accessibility bits of these segment words.

The accessibility data may be: 00: no access, hence protection interruption. 01: access only for reading, protection interruption for immanent writing. 10: access for reading and writing: as yet no change. 11. access for reading and writing: subsequent to change.

There are provided gates $G_{12}$ and $G_{13}$ controlled through the conductors REPE and REPE' respectively, like the gates $G_7$, $G_8$, $G_9$ and $G_{10}$ (see FIG. 1), when a new segment word SW has to be introduced from the store M into one of the segment word registers $SW_2$ or $SW_3$. There are furthermore provided gates $G_{14}$ and $G_{15}$, controlled through the conductors SKE and SKT respectively, like (see FIG. 1) the gates $G_3$, $G_4$, $G_5$, $G_6$, when a comparison in the comparison device $D_6$ or $D_7$ leads thereto. When the gate $G_{14}$ or $G_{15}$ is thus opened, the accessibility bits AC of the segment word register portion SACE or SACT of the segment word register $SW_2$ or $SW_3$ are compared in a checking device EV with a signal E, which indicates that will happen in the segment concerned. If this does not correspond to the contents of the segment word register portion SACE or SACT, an alarm signal is produced at the output MPRAC of the checking device. EV. From FIG. 3 it will be apparent that no register portion SACN is provided for the O-segment; this is not necessary because in this segment only one type of accessibility, that is to say, 11 is possible. FIG. 3 shows furthermore a computer register K, in which the segment base addresses are stored when one of the gates $G_1$, $G_3$ or $G_5$ is open. At the bit locations 08 to 31 in the summation device X the physical address FA is formed from the register K, in which a base address is stored at the bit locations 08 to 23, supplemented by 8 noughts 24 to 31, and from the register L, in which the address AS is stored at the bit locations 14 to 31, preceded by 6 noughts at the locations 08 to 13. The operation is otherwise the same as described with reference to FIG. 2.

When the computer operates in the programme indexing mode, the same applies as that explained hereinbefore with respect to segment indexing; the difference being, however, that no use is made of the segment word register portions SACE and SACT with the associated gates, since a programme word PW does not have accessibility bits AC. In a programme word PW the programme length datum PL occupies 4 bits apart from 16 bits for the programme base address PB. The programme word register portions PLN, PLNE and PLT of the programme word register $PW_1$, $PW_2$ and $PW_3$ have a length of 16 bits in order to be able to contain these PL - 16 bits. In the segment indexing mode these register portions (then SLN, SLE and SLT) are employed only partly because a segment length datum has only 10 bits. The programme word register $PW_1$ is filled with data of the O-programme, whereas the two further registers $PW_2$ and $PW_3$ contain data of two further programmes.

At the change-over from segment indexing to programme indexing or conversely first the O-segment data have to be replaced by the O-programme data or conversely. This is performed from the control-device PS, which selects the O-programme word from the store and opens the gates G and $G_{11}$ through the conductor SENYM so that the register portion SBN (now PBN) can receive the O-programme base and the register portion SLN (now PLN) can receive the O.programme length datum. The same applies to the O-segment data with a changeover to segment indexing. The other registers $PW_2$ and $PW_3$ (or $SW_2$ and $SW_3$) can receive programme words associated with two other programme numbers PN, when they are called.

It should again be noted that when segment indexing and programme indexing are used in the same computer it is not necessary in programme indexing to employ three registers as programme word registers since only one segment word register need be sufficiently large for receiving the maximum programme length information PL. For this purpose it is preferred to use the O-segment word register $SW_1$ (then $PW_1$) so that only therein the register portion SLN should have 16 bit locations (PLN) instead of having 10 bit locations. In this case the programme word register $PW_1$ has to be filled in dependence upon the programme number called, with the relevant programme word (0 to 16) (consequently not always with the O-programme word alone).

What is claimed is:

1. A computer comprising a store addressable in a plurality of numbered word segments, each word segment having at least a segment base address portion and a segment length data portion, said store including a plurality of storage locations selectable by a segment number register wherein said segment words are stored, said computer further comprising converting means for converting logical segment addresses into numbered word segments for selecting said memory storage location, said converting means comprising a first segment word register having a first part thereof storing a segment base address portion and a second part storing a segment length data portion of one said numbered word segment, a register for storing a logical segment address to be converted, a summation device to address parts of the segment word register and the logical address register for combining said address parts to form a said numbered word segment, a comparison device for comparing said segment length data with said numbered word segment derived from the two said registers for checking whether said numbered word segment is located within said one numbered word segment, at least one further segment word register for storing the segment base address and the segment length data of at least one further segment contingent to said one numbered word segment, said segment number register responsive to said derived numbered word segment to select a said numbered word segment, a detection device responsive to the select segment number register contents for detecting if, and consequently in which of said two segment word registers the segment word of the derived numbered word segment is stored, said detection device including means for applying a control-signal to the relevant one of said two segment word registers, said detection device further having means responsive to the absence of the segment word of said derived numbered word segment in one of the two segment word registers for applying a control-signal to said numbered word register for transferring the segment word of said derived numbered word from the numbered word register to one of the segment word registers.

2. A computer as claimed in claim 1, wherein three segment word registers are provided and in that one of the segment word registers is constantly provided with a segment base address and a segment length information of a given segment.

3. A computer as claimed in claim 1, wherein storage locations selectable by segment numbers are provided with means for storing segment accessibility data, said segment word registers being provided with locations for storing said segment accessibility data.

4. A computer as claimed in claim 1, further providing for the segment addressing of a segment mode including segmented programmes as well as segment addressing in which programmes as a whole may be considered to form individual segments and wherein said computer comprises a control-device for producing a signal at the change over from one type of segment addressing to the other on a conductor, said signal capable of controlling said one of said segment word registers for storing the initial segment word of the relevant segment addressing mode.

* * * * *